United States Patent
Pratt et al.

(10) Patent No.: US 12,463,961 B2
(45) Date of Patent: Nov. 4, 2025

(54) TEMPORARY IDENTIFIERS FOR NETWORK AND SERVICE ACCESS AND FOR TRANSACTION RECORDATION

(71) Applicant: AT&T Intellectual Property I, L.P., Atlanta, GA (US)

(72) Inventors: James Pratt, Round Rock, TX (US); Yupeng Jia, Austin, TX (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 295 days.

(21) Appl. No.: 18/074,797

(22) Filed: Dec. 5, 2022

(65) Prior Publication Data

US 2024/0187403 A1    Jun. 6, 2024

(51) Int. Cl.
*H04L 9/40* (2022.01)
*G06Q 20/38* (2012.01)

(52) U.S. Cl.
CPC ......... *H04L 63/083* (2013.01); *G06Q 20/389* (2013.01)

(58) Field of Classification Search
CPC ............................ H04L 63/083; G06Q 20/389
USPC .......................................................... 726/9
See application file for complete search history.

(56) References Cited

U.S. PATENT DOCUMENTS

| | | | |
|---|---|---|---|
| 2021/0135901 A1* | 5/2021 | Xie | H04L 12/4625 |
| 2022/0129389 A1* | 4/2022 | Shiner | G06F 21/602 |
| 2022/0374880 A1* | 11/2022 | Mallela | H04L 63/0435 |
| 2022/0400000 A1* | 12/2022 | Raj | H04W 12/06 |
| 2023/0231836 A1* | 7/2023 | Pegoraro | H04L 9/3239 713/160 |
| 2023/0422030 A1* | 12/2023 | Perez Martinez | H04L 9/50 |

FOREIGN PATENT DOCUMENTS

WO    WO-2011080635 A2 *   7/2011   ............ H04M 15/00

OTHER PUBLICATIONS

Hyperledger Foundation, "About Hyperledger Foundation", accessed from https://www.hyperledger.org/about on Nov. 9, 2022, 10 pages.

(Continued)

*Primary Examiner* — Moeen Khan

(57) ABSTRACT

A processing system including at least one processor may obtain at least a first identifier associated with an endpoint device of a user at a location, determine, based on the at least the first identifier, that the user is an authorized participant of at least one service at the location, and provide an identity token to the endpoint device, where the identity token is for use at the location in connection with the at least one service, provide to the endpoint device a list of other identity tokens associated with endpoint devices of other users at the location, detect a communication between the endpoint device of the user and an endpoint device of the other user in accordance with the identity token and another identity token, from among the other identity tokens, and record information characterizing the communication in an electronic ledger associated with the at least one service.

20 Claims, 3 Drawing Sheets

(56) References Cited

OTHER PUBLICATIONS

Ledger-Insights-blockchain-for-enterprise, "EY-solution-private-transactions-on-public-Ethereum" Oct. 31, 2018, accessed from https://www.ledgerinsights.com/ey-blockchain-private-transactions-ethereum/, 4 pages.
Ethereum, "Oracles", accessed from https://ethereum.org/en/developers/docs/oracles/ on Nov. 9, 2022, 15 pages.
Digital Trends, "What-is-an-eSIM-Heres-everything-you-need-to-know", Sep. 14, 2022, accessed from https://www.digitaltrends.com/mobile/esim-explainer/, 30 pages.
Mearian, L., "What's a smart contract (and how does it work)?," Computerworld, Jul. 29, 2019, 9 pages.

* cited by examiner

TEMPORARY IDENTIFIERS FOR NETWORK AND SERVICE ACCESS AND FOR TRANSACTION RECORDATION

The present disclosure relates generally to communication network operations, and more particularly to methods, computer-readable media, and apparatuses for providing an identity token to an endpoint device for use at a location in connection with at least one service.

BACKGROUND

In many large-scale public emergencies, personnel of public service entities (PSEs) from other regions may be called to serve in an affected area. Typically, these personnel may undergo manual assurance and validation processes and procedures before gaining access to information systems of one or more PSEs of the affected area. For example, when responding to an emergency in the northeast region, utility workers, emergency medical service (EMS) personnel, or law enforcement personnel from other regions may need access to critical information, but are required to be authenticated and authorized before accessing such information.

SUMMARY

In one example, the present disclosure describes a method, computer-readable medium, and apparatus for providing an identity token to an endpoint device for use at a location in connection with at least one service. For example, a processing system including at least one processor may obtain at least a first identifier associated with an endpoint device of a user at a location, determine, based on the at least the first identifier, that the user is an authorized participant of at least one service at the location, and provide an identity token to the endpoint device, wherein the identity token is for use at the location in connection with the at least one service. The processing system may then provide to the endpoint device a list of other identity tokens associated with endpoint devices of other users at the location, detect a communication between the endpoint device of the user and the endpoint device of another user of the other users in accordance with the identity token and another identity token, from among the list of other identity tokens, and record information characterizing the communication in an electronic ledger associated with the at least one service.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
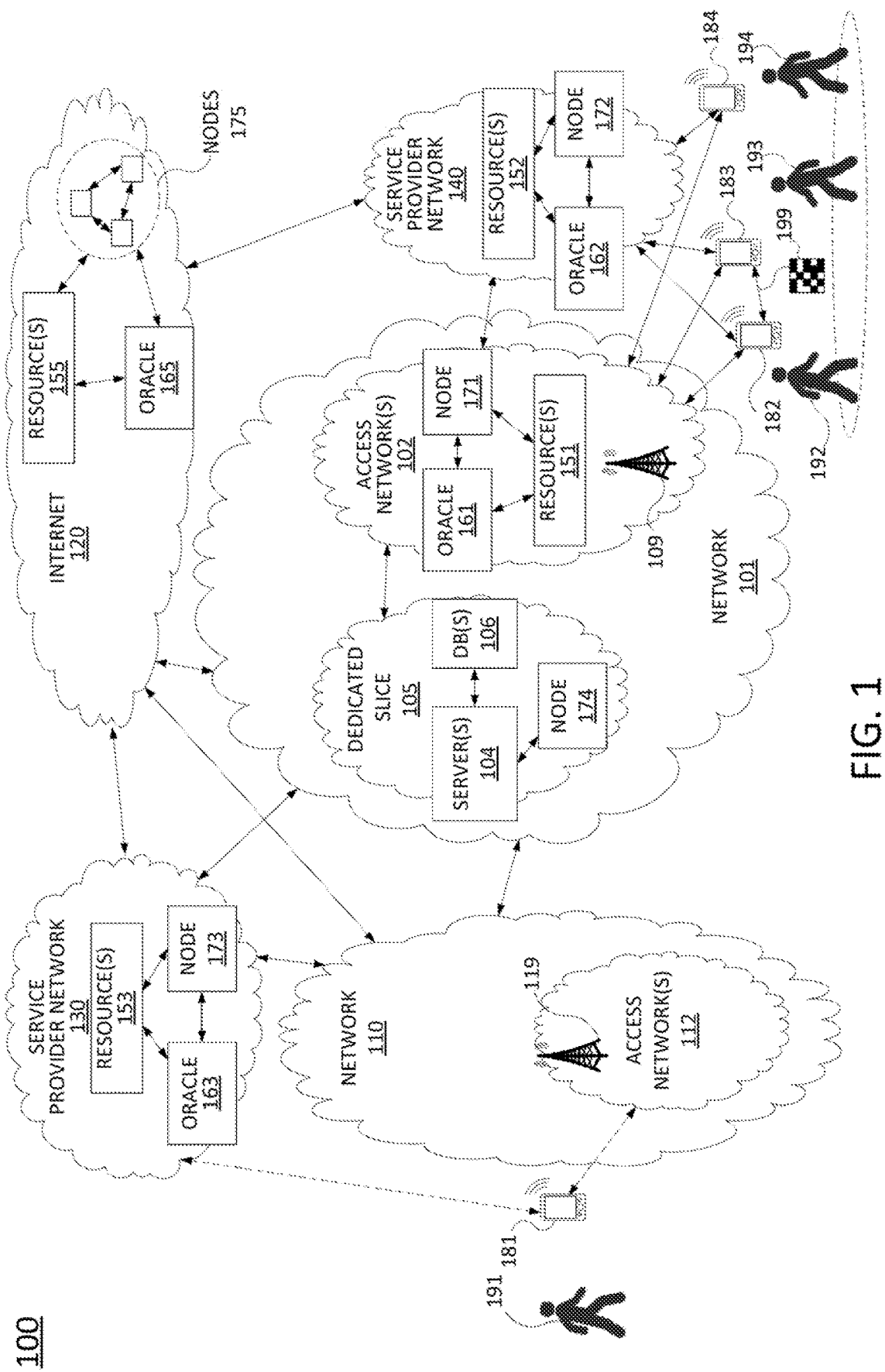
FIG. 1 illustrates an example network related to the present disclosure.

Examples of the present disclosure provide for methods, computer-readable media, and apparatuses for providing an identity token to an endpoint device for use at a location in connection with at least one service. As noted above, in many large-scale public emergencies, personnel of public service/safety entities (PSEs) from other regions may be called to serve in an affected area. Typically, these personnel may undergo manual assurance and validation processes and procedures before gaining access to information systems of one or more PSEs of the affected area. Different regions (or PSEs within various regions) may have different approaches, and in some cases limited resources, for onboarding visiting PSE personnel (broadly "guest users"). In addition, these ad-hoc procedures may take up critical time, which can mean the difference between a mild impact and a heavy impact on the ability to respond to an emergency. Examples of the present disclosure are described herein illustratively in connection with first responders (e.g., firefighters, police, emergency medical service (EMS) personnel, etc.) and/or governmental or quasi-governmental entities (e.g., military, public health entities, hazardous materials (hazmat) units, etc.) that are entitled to access and utilize a priority network, or priority network slice(s). However, examples of the present disclosure may also include other PSEs that may provide important services in emergencies and disaster situations. For instance, this can include electric, water, gas, and sewerage utilities, and so forth. In addition, examples of the present disclosure may further relate to authorization and verification of access to events or venues (e.g., for entertainment, conferencing, etc.), and to facilitate pseudo-anonymous communications among participants/members during an event and/or while present at a venue.

In one example, the present disclosure disaggregates services and one or more device/user identities to protect/isolate interactions, allowing easier cross-provider and cross-service mixing. In one example, a temporary identifier is assigned to a user device by a communication network to enable these features. In addition, in one example, the present disclosure utilizes smart contract and blockchain ledger recordation for secure and trusted mobility transactions and group membership verification, with intelligent control and negotiation for devices/users in-event. Service providers in a group may maintain identity-to-service mappings (in other words, each service provider may define what service(s), data, and communications are permitted and/or accessible to a device/user based on a temporary identifier). For instance, using smart contracts and blockchain/ledger activity, service providers may specifically define the entry, exit, and ownership of data between users for specific events (e.g., a specific conference, music show, classroom performance, learning session) or classes of events (e.g., all concerts on a tour, etc.). Thus, examples of the present disclosure enable seamless joining of devices/users for private/protected events. A user may gain access with a specific device identifier and/or a prior service token, biometrics, etc. A temporary identity token may then be provided/assigned to the user (e.g., to the endpoint device of the user) that may be used to permit or deny various transactions, and to record transactions associated with the user during an event or in connection with a participation in a group and/or event.

Notably, cross-provider evolution is moving beyond compatibility of network technology alone. Examples of the present disclosure enable tighter, secured sharing of data and more seamless communication interactions. For instance, examples of the present disclosure may establish a trusted virtual space for a local event where, instead of logging into a classic web and data experience, a more advanced (and privacy protected) event ecosystem is provided that governs content generation, sharing and access, quality of service (QoS), and other communication network service aspects.

For instance, users/participants may share contacts, data, etc. as part of joining a group or event, with clear, predefined rules for how long data lives, how long temporary identifiers are valid, which identifiers may be used for communications with other temporary identifiers, and so forth. In one example, all transactions, including joining of a group/event, communications among participants, creation of data, accessing of data, and so forth, may be logged via smart contract rules and blockchain ledger process.

In an illustrative example, a communication network may be a participant in temporary group/event creation and management. In particular, in one example, the communication network may assign a temporary phone number to a participant device in an area. For instance, this may be a device of a first responder from out of area who is assisting in an emergency, disaster recovery, etc. The participant may communicate with others using the temporary phone number. As such, there is no need to provide the participant's preassigned phone number. However, local connectivity may be established via the temporary phone number. In one example, the participant device may be a dual-subscriber identity module (SIM) or eSIM enabled-device. In one example, temporary phone numbers are visible in a blockchain ledger and are usable by participants to communicate among each other. In one example, temporary access may expire after an event has ended according to one or more predefined rules. Thus, participants are provided fast collaboration for emergency and ad-hoc civil events. Through sharing of temporary identifiers (e.g., temporary phone numbers) within a local area, emergency personnel can quickly allow volunteers, out-of-area first responders, and other participants to join. This allows faster communication within a closed group in a secure and trusted way. In addition, as noted above, transactions of the event/group may be recorded in a distributed ledger, such that expiration of the group may be facilitated in a timely fashion, but where a record is maintained of the participants, and their interactions/communications, or other transactions (such as data generation, access, etc.) for future auditing, training review, or other purposes. In one example, an event/group may have multiple service provider hosts/owners. For instance, at a minimum, this may include a communication network operator assigning temporary identifiers and facilitating communication among participants. Notably, devices having primary network service from different network operators may each be assigned a temporary identifier that is associated with a single communication network operator. Thus, communications among participant using temporary identifiers may be consolidated to a single network (e.g., a single mobile/cellular network).

In addition, an event/group creator may be a public safety entity (PSE) or the like that is responsible for an area in which there is an emergency, a concert organizer, an event venue owner or operator, and so forth. In one example, once a user/endpoint device is authorized and assigned a temporary identifier, each service provider may define different tiers of service or membership based on the temporary identifier(s). For instance, some temporary identifiers may be enabled as "first tier" communicators (e.g., those that can broadcast). Other temporary identifiers may be enabled as "second tier" communicators (only listening or receive calls). In one example, temporary identifiers may also be used by a network operator to provision certain resource to a controlled group (e.g., computing resources, location information, etc.) that can be added or removed (e.g., edge cloud resources, or the like).

In one example, some temporary identifiers may be enabled to record data for the event, while others may be read-only. Similarly, in one example, some temporary identifiers may be enabled to access certain types of data, while others are not. For example, a fire marshal may be able to access biometric data of participants at an event (e.g., fire fighters, fire engineers, engine or truck drivers, etc.), while these other participants do not have access to each other's biometric data. In one example, these rules may be implemented according to a smart contract. In another example, service provider members may implement their own service-identity rules/mappings, where transactions occurring in accordance with these service-identity mappings may be recorded in a distributed ledger.

To further illustrate, in one example, a user may join an event or group for transactions by accessing a specific token for joining. In one example, a user may scan a barcode, quick response (QR) code, or the like that may be presented on a screen of an authorized device, e.g., a screen of a fire marshal's mobile phone, a check-in kiosk, etc. Alternatively, or in addition, a user may be provided a token in advance such as via email, text message, a scannable image provided on a physical surface (e.g., a paper or card, etc.), and so forth. In one example, the token may comprise a uniform resource locator (URL) or the like, or may otherwise cause a user device to connect to a server for obtaining access permission to join the event/group. In one example, the user device may connect to a server, e.g., a smart contract oracle or execution node that may evaluate the user device, its identities, one or more tokens that may be possessed and presented by the user device, answers to challenge questions from the user, etc. In one example, the server may be a server of a network operator that participates in the creation and management of the group/event. In one example, the evaluation may be in accordance with one or more smart contract rules. In the case that the user/device possesses the correct credentials and is authorized, the device may be assigned a temporary identifier (e.g., a temporary phone number). In one example, the device may have a dual-SIM and/or eSIM to continue to be associated with a previously assigned phone number, but to also be associated with the new, temporary phone number for use in connection with the event/group.

Via the device, the user may inspect specific data of the event with trusted approval. This data may include contact information of other participants (which may include similar temporary identifiers), data (e.g., biometric data, location data of infrastructure, other participants, etc., pricing data, content, or the like), and transaction records (e.g., purchasing, sharing, social communications, data creation, data access by others, etc.). In this regard, it should again be noted that transactions may be logged in a distributed ledger (e.g., a blockchain ledger). Alternatively, or in addition, transaction details/records may be logged in an off-chain data repository, but the occurrence of the transaction and the existence of an off-chain record may be logged in the distributed ledger. In one example, the ledger record may include a pointer or other information indicating where the actual transaction record is stored.

In one example, if a user attempts to access traffic/data/services not authorized, the attempt may fail quietly on the user device, while the failure may be logged in a transaction record. Other communications may be similarly logged as transactions, where anonymous, temporary identifiers (e.g., phone numbers or tokens linked to the phone numbers) may memorialize the participants. In one example, a network operator that assigns temporary identifiers may re-identify participants by maintaining an off-chain mapping of long-term identifiers (e.g., permanent/prior phone numbers) to temporary identifiers (e.g., temporary phone numbers).

In one example, a user may share certain digital assets (e.g., phone number, content, social connection, personal profiles) with other participants via the anonymous, temporary identifier. In one example, a user may also share the temporary identifier with other non-participants/non-members. For instance, a rescue personnel may share a temporary identifier with other rescue personnel to remain in contact. However, the temporary identifier may also be given to members of the general public. For instance, a person may initially refuse to be rescued from a home without electricity or running water. However, the person may have a change of circumstance and may attempt to call the rescue personnel back for assistance, may call the rescue personnel to confirm that the person continues to remain safe, may point out new hazards that are visible to the person but that the rescue personnel may be unaware of, and so forth.

When joined into an event/group, services may be "scoped." For instance, search, media, or other content accesses, network-based communications, and so forth may be scoped for participants, available data, and other information that is part of an event/group. For example, a search for "Jane" may be de-referenced from millions of identities on the Internet, to search for a specific identity or identities of participant(s) in the event. In one example, a user's network service and connectivity may change through this scoped activity, e.g., changing to a different network operator, changing routing, adding different redundancy, changing QoS, and so forth.

In one example, the onboarding of users/participants may be in accordance with a smart contract evaluation. In one example, the smart contract may be established in advance as a template for events of a certain type. The smart contract may be established and agreed among two or more service providers, e.g., at least one network operator, and at least one other service provider, such as a PSE, an event host, a venue operator, etc. In one example, the smart contract may also comprise rules for event termination, restart, initiation and evaluation of other smart contracts (e.g., when a critical phase of an emergency ends, such as for a hurricane or other natural disasters, another phase managed via another smart contract may be initiated related to insurance, legal claims, rebuilding, etc.), and so forth. It should also be noted that in one example, resources that are managed by each service provider may still be associated with optimization strategies for local resource execution. For instance, a public safety entity (PSE) may restrict guest personnel in accordance with local policies/rules that may exist outside of and/or in parallel with a smart contract. For example, a PSE may not be required to permit guest personnel access to biometric data of all other assisting personnel, even if the guest personnel is accustomed to having access to similar data when in a home jurisdiction.

In one example, the smart contract rules may include rules that permit or deny transactions (e.g., communications, recording of data, accessing of data, physical access to a premises or other locations, etc.). In addition, in one example, the smart contract rules may also include rules that indicate which transactions are to be recorded in a distributed ledger, when such transactions are to be recorded, etc. In one example, smart contract rules may alternatively or additionally indicate which transactions to record off-chain, when to record such transactions, when to delete one or more records, and so forth. In one example, ledger records or off-chain records may be revisited for historical analysis, training, etc. For instance, a fire marshal may write an incident report and may review the blockchain records for accuracy in a sequence of events. It should be noted that in one example, a distributed ledger, e.g., blockchain records, may include the temporary identifiers of various users/participants. In addition, in one example, a network operator may maintain long-term identity to temporary identity mappings. However, in one example, the network operator may delete such mappings to permanently dereference users from their anonymous temporary identifiers.

It should be noted that examples of the present disclosure may also extend to the creation of new virtual spaces that may be centered on a local event. For instance, different user devices may easily join a protected space where digital assets created and interacted with are protected and limited to participants in an event. For example, as part of attending an in-person conference, participants may be provided access to a virtual space (e.g., a virtual reality (VR) environment) for further interactions among participants. In one example, evaluation of smart contract rules provide an opt-in/opt-out scenario—to allow joining or not joining an event as a means for not accepting the smart contract. For instance, a user may purposely desire to not receive communications of an event during a certain time at a certain place (e.g., personnel of a PSE who are off-duty, who are in a mandatory rest period, etc.). Similarly, a user may wish to not communicate with others at a conference, even with a temporary identifier.

In another implementation, users may be added to this temporary space with temporary identifiers via a functional- or role-specific identification such that communications and data flows are permitted under certain conditions or in a certain direction. For example, in the formation of a temporary group that is centered around a car accident, a cohort of users may be temporarily added for actuarial services, but those newly added users will not be able to access any data within the virtual space unless called upon by an existing user such as a forensic investigator. However, the existing users (police, investigators, participants), may generically reach out for actuarial services or data that exists within the space by querying for the role, without specifically knowing the user(s) that fulfill(s) that role. With no loss of generality, identifiers may be assigned to any set of users that are non-living entities, such as software executing routines for automated chatbots, virtual assistants, computational engines, etc. or hardware devices providing services such as the capture or analysis of sensor data (e.g. commandeered street cameras), the ad-hoc editing of data streams (e.g. augmenting or diminishing visual streams for augmented reality (AR)/virtual reality (VR) extended reality (XR) uses), etc.

Thus, examples of the present disclosure provide for assignment of anonymous temporary identifiers to user devices when authenticated and authorized to participate in an event/group. In one example, the granting of access, assigning of temporary identifiers, and the continued ability to communicate among participants, to create and access shared data relating to an event/group, and to memorialize transactions of the event/group may be facilitated via the use of smart contract requirements and distributed ledger (e.g., blockchain) recordation. Within the event/group, all devices may defer to the smart contract and distributed ledger for validation and execution. However, an orchestration system may manage creation of the smart contract in advance among service provider hosts/owners. The present disclosure allows protected anonymization of the IMEI or other identifier(s) of participants' devices, which are obfuscated by a network operator via assignment of temporary identifiers. Ultimately, examples of the present disclosure provide fast collaboration for emergency and ad-hoc civil entities, and may be further extended to conference collaboration, attendance at entertainment events, and other scenarios. These and other aspects of the present disclosure are discussed in greater detail below in connection with the examples of FIGS. 1-3.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 101. The network 101 may include one or more access networks 102. The network 101 may be in communication with the Internet 120, network 140 (e.g., another communication network, e.g., a cellular network), and service provider networks 130 and 140. In one example, network 101 may combine core network components of a cellular network with components of a triple play service network, where triple-play services include telephone services, Internet services and video services (e.g., television services) to subscribers. For example, network 101 may functionally comprise a fixed mobile convergence (FMC) network, e.g., an IP Multimedia Subsystem (IMS) network. In addition, network 101 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 101 may further comprise a video broadcast network, e.g., a traditional cable provider network or an Internet Protocol Television (IPTV) network, as well as an Internet Service Provider (ISP) network. In one example, network 101 may include a dedicated slice 105, e.g., a "network slice" that is reserved for first responders and/or governmental entities or quasi-governmental entities. For instance, dedicated slice 105 may comprise cellular core network components that service such entities, users associated with such entities, and/or their endpoint devices, while other users, entities, and/or their endpoint devices may be serviced by a different network slice, or slices. In one example, dedicated slice 105 may include one or more servers 104 and one or more databases (DBs) 106, as discussed in further detail below. In one example, network 101 may also include a plurality of video broadcast servers, a plurality of content servers, and so forth. For ease of illustration, various additional elements of network 101 are omitted from FIG. 1.

In accordance with the present disclosure, network 101 may be a service provider associated with various temporary events/groups. In one example, network 101 may include one or more smart contract and/or distributed ledger (e.g., blockchain) components. For instance, dedicated slice 105 may include a node 174 (e.g., a blockchain node). Similarly, access network(s) 102 may include a node 171 (e.g., a blockchain node) and an oracle 161. In one example, either or both of node 171 and oracle 161 may execute a smart contract. In one example, node 174 may further execute the smart contract. It should also be noted that any number of server(s) 104 or database(s) 106 may be deployed. In one example, a communication network (e.g., comprising network 101, access network(s) 102, etc.) may provide a temporary identifier service in connection with events/groups managed via smart contract and/or distributed ledger, e.g., in addition to phone, data, video, and/or other communication services. For instance, DB(s) 106 may include one or more of a home location register (HLR), a visiting location register (VLR), etc., server(s) 104 may comprise an authentication, authorization, and accounting (AAA) server, and so forth.

In one example, the access network(s) 102 may comprise fiber optic access networks (e.g., fiber to the curb (FTTC) and/or fiber to the premises (FTTP) access networks), Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 101 may provide data services, voice/telephony services, cable television services, an IPTV service, or any other types of communication service to subscribers via access network(s) 102. In one example, the access network(s) 102 may comprise different types of access networks, may comprise multiple instances of a same type of access network, or some access networks may be the same type of access network and other may be different types of access networks. In one example, the network 101 may be operated by a communication network service provider. In one example, access network(s) 102 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 102 may include at least wireless access point 109 (e.g., a cellular base station, such as an eNodeB, a gNB, or the like).

In one example, the access network(s) 102 may be in communication with various devices, local networks, and/or computing systems/processing systems. For instance, the access networks 102 may be in communication with a service provider network 140, which may contain one or more resources 152. In an illustrative example, service provider network 140 may be associated with a public safety entity (PSE). However, in other examples, service provider network 140 may be associated with a conference host, an event venue, an event organizer, etc. In one example, the one or more resources 152 may include information/data resources, such as utility maps, property records (e.g., architectural plans, wiring diagrams, etc.), property ownership records, medical records, personnel records and contact information of various personnel a PSE, purchase order information (e.g., to order supplies, etc.), passcodes/keys (such as to disable or activate fire suppression systems, public announcement systems, etc.), and so forth. The nature of the resource(s) 152 may vary depending upon the nature of the PSE (e.g., first responders (e.g., firefighters, police, emergency medical service (EMS) personnel, etc.) and/or governmental or quasi-governmental entities (e.g., military, public health entities, etc.), utilities, and so forth). In one example, the resources 152 may comprise one or more database servers storing information that may be accessed by personnel of the PSE (as well as guest users having temporary authorizations).

Devices 181-184 may comprise various computing devices (broadly "endpoint devices") that may be used by participants/users to access resources (e.g., resources 152, etc.) and to perform various other tasks, such as to communicate with other participants in a group/event and/or the general public in an area, to add new information to resources (e.g., resources 152, etc.), and so forth. For instance, devices 181-184 may include mobile computing devices such as smart phones, laptop computers, tablet computing devices, wearable computing devices (e.g., augmented reality (AR) headsets, smartwatches, etc.), or the like. Devices 181-184 may be equipped with wired and/or wireless networking/communication capability. In this regard, devices 181-184 may each include transceivers for wireless communications, e.g., for Institute for Electrical and Electronics Engineers (IEEE) 802.11 based communications (e.g., "Wi-Fi"), IEEE 802.15 based communications (e.g., "Bluetooth," "ZigBee," etc.), cellular communication (e.g., 3G, 4G/LTE, 5G, etc.), and so forth. Devices 181-184 may be associated with respective users 191-194.

Network 110 may comprise a second communication network (e.g., a communication service provider network) of a same or similar nature as network 101. As such, network 110 may include an access network 112 (e.g., a cellular access network) having at least one wireless access point, such as base station 119. In the example of FIG. 1, either or both of the networks 101 and 110 may be in communication with service provider network 130. In one example, service provider network 130 may be associated with a second service provider, such as another PSE.

In one example, devices 181-184 may comprise PSE-managed devices. For instance, devices 183 and 184 may be managed devices of a first PSE associated with service provider network 140. In one example, devices 183 and 184 may be further associated with network 101. For instance, subscriber identity modules (SIMs) of devices 183 and 184 may be associated with network 110 and may permit the usage of network 101 for communication services (e.g., via access network(s) 102). Likewise devices 181 and 182 may be managed devices of a second PSE associated with service provider network 130. In one example, devices 181 and 182 may be further associated with network 110. For instance, subscriber identity modules (SIMs) of devices 181 and 182 may be associated with network 110 and may permit the usage of network 110 for communication services (e.g., via access network(s) 112).

As noted above, examples of the present disclosure may also implement smart contract features and/or distributed ledger (e.g., blockchain) technologies to establish and maintain temporary groups, to create shared virtual spaces, to control participation and membership to events/groups, and so forth. In this regard, the example of FIG. 1 illustrates a plurality of nodes 171-175, e.g., blockchain nodes participating in the maintenance of a distributed ledger (which may also be referred to as a blockchain network). In one example, nodes 171-175 may implement a smart contract that is written to the blockchain/distributed ledger and that is executed by the nodes 171-175. In an illustrative example, a first PSE associated with service provider network 140 and the network 101 may establish a smart contract that governs the creation and maintenance of a temporary event and/or group. In other words, these entities may be group/event "owners" or member entities. For instance, the smart contract may be established for events of a particular event type (e.g., a major fire incident that may involve participation of first responders from nearby jurisdictions (e.g., other PSE(s), search and rescue in response to forest fires, hurricane, flooding, or the like, etc.)). The smart contract may serve as a template for the management of network-based communications among PSE personnel and guest personnel of other PSEs, the creation, storage, retention, access, and/or sharing, of data pertaining to transactions associated with the event/group, and so forth. In one example, multiple non-network service providers may comprise event member entities. For instance, the smart contract may be established among multiple nearby fire departments and the network 101. When there is an incident within the jurisdiction of one of the fire departments, a new event/group may be instantiated for the incident. While one of the fire departments is primarily responsible for responding to the incident, other fire departments may send personnel to assist. In this regard, the sending department(s) may wish to have access to records of the event (which may be stored in a distributed ledger/blockchain accessible to member entities) to monitor their own personnel, for auditing of a timeline of events relating to their personnel, for learning from the incident occurring in the other jurisdictions to better prepare for similar incidents within its own jurisdiction, and so forth. Thus, in the present example, service provider network 130 includes a node 173, which may participate in maintaining a distributed ledger/blockchain in conjunction with nodes 171, 172, 174, and 175.

As further illustrated in FIG. 1, there are a number of "oracles" 161, 162, 163, 165. These oracles 161, 162, 163, and 165 may each comprise one or more servers, or processing systems, that are external to the blockchain network, but which are trusted to obtain and/or to provide data that may comprise inputs to the smart contract (e.g., which may be evaluated by the rule(s) of the smart contract) for causing various actions. Alternatively, or in addition, one or more of the oracles 161, 162, 163, or 165 may be configured to receive instructions from any one or more of the nodes 171-175 to perform one or more actions in accordance with a smart contract rule, or rules. In one example, one or more rules of the smart contract may have an action that comprises instructing one or more of the oracles 161, 162, 163, or 165 to perform a task that may include obtaining data from external sources, evaluating the data, performing an action in response to the evaluation, and reporting to the one or more of nodes 171-175 of such action(s). For instance, in one example, oracles 161, 162, 163, or 165 may be configured to execute one or more smart contracts (e.g., sub-contracts, or supplemental contracts, which are integrated with the "main" smart contract that is implemented on-chain (e.g., by the one or more of the nodes 171-175)).

In one example, oracle 161 may comprise a computing system or server, or one or more computing systems or servers, such as computing system 300 depicted in FIG. 3, and may individually or collectively be configured to perform operations or functions for providing an identity token to an endpoint device for use at a location in connection with at least one service (such as illustrated and described in connection with the example method 200 of FIG. 2). Similarly, oracles 162, 163, and 165 may each comprise a computing system or server, or one or more computing systems or servers, such as computing system 300 depicted in FIG. 3, and may individually or collectively be configured to perform operations or functions in connection with examples of the present disclosure for providing an identity token to an endpoint device for use at a location in connection with at least one service.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

Continuing with the present example, a PSE associated with service provider network 140 may trigger the creation of an event/group in accordance with the smart contract by declaring an "event." For instance, resource(s) 152 may include an operations management system of the PSE. An authorized user, such as user 193, may provide an input to the operations management system, e.g., via device 183 to indicate an event. In one example, the user 193 may indicate an "event type" such as "major fire," "search and rescue," "hazmat," etc. In one example, oracle 162 in communication with the operations management system (e.g., resource(s) 152) may thus obtain notification of this input (e.g., via a push notification and/or via a polling/pull model). In addition, oracle 162 may be configured to report such an input to one or more of the nodes 171-175. Alternatively, or in addition, nodes 171-175 may poll oracle 162 (e.g., on a periodic basis or otherwise) for any updates. In any case, notification of the input may be received by the nodes 171-175 and may be evaluated against one or more rules of the smart contract. In this regard, at least one rule of the smart contract may indicate that a temporary group/event should be established in response. In one example, the rule(s) may have one or more corresponding actions which may include instructing oracle 162 to provide a scannable QR code, barcode, or the like (e.g., scannable code 199) to device 183, instructing oracle 161 to reserve temporary phone numbers or other identifiers for devices of participants/users, and so forth.

In one example, the PSE may invite/request other PSEs to send personnel to assist. For example, the PSE associated with service provider network 140 may request personnel from the PSE associated with service provider network 130. In this case, user 192 with device 182 may volunteer and/or be instructed to attend. As noted above, device 182 may have a SIM (and associated telephone number) associated with network 110. Thus, network 101 may generally not be able to provide enhanced services to device 182 on behalf of the PSE associated with service provider network 140 (such as enhanced QoS, push-to-talk service, etc.). At a minimum, device 182 may not be fully integrated within the communication ecosystem of service provider network 140 and network 101. However, in accordance with the present disclosure, upon arrival at the scene, user 192 may check in with user 193 (e.g., a fire marshal, an incident supervisor, etc.). In one example, user 192 may scan the scannable code 199 with a camera of device 182, e.g., off a screen of device 183. In one example, the scannable code may direct device 182 to a URL which may connect the device 182 to oracle 161.

In this regard, oracle 161 may be configured to authenticate device 182 and/or user 192, and to assign a new, temporary telephone number upon success. In one example, access of the scannable code 199 may be sufficient to establish the entitlement to be granted access and to participate in the group/event. In another example, device 183 may obtain one or more existing identifiers of device 182 and may provide these to oracle 162. Oracle 162 may be configured to provide these identifier(s) to oracle 161 to verify device 182 against a list of authorized participants. In still another example, the PSE associated with service provider network 140 may provide an additional token to service provider network 130, which may distribute the token to devices of any personnel that may be sent to assist. In one example, device 182 may present this additional token as a further credential when attempting to authenticate via oracle 161.

Assuming that the authentication is successful, oracle 161 may assign a temporary telephone number to device 182. In one example, the telephone number, a device identifier (e.g., an international mobile equipment identifier (IMEI)), a SIM identifier (e.g., an ICCID, UICCID), and/or other device, SIM, or user identifiers may be added to a home location register (HLR), a visiting location register (VLR), and so forth. As such, device 182 may be associated with and may communicate with others using the temporary telephone number via network 101 and access network(s) 102 in particular. In other words, device 182 is added as a subscriber device of network 101 (e.g., even if device 182 generally obtains primary communication network services from network 110). In this regard, device 182 may comprise a dual-SIM or eSIM enabled device, such as described above.

In one example, the telephone number may be used as an identity of the user 192 for purposes of gaining access to resource(s) 152 of the service provider network 140, for communicating with other participants, such as device 184 of user 194 via access network(s) 102 and/or peer-to-peer communications, for obtaining enhanced services from network 101 (e.g., reduced latency, increased bandwidth, priority queuing, etc. such as via dedicated slice 105), and so forth. In one example, the arrival of the user 192 and checking in with device 183 of user 193 may comprise a "transaction." Similarly, the requesting and/or obtaining of a temporary number from oracle 161 may comprise another "transaction." Likewise, communicating with user 194 via device 184, accessing resource(s) 152, and so forth may comprise "transactions." In accordance with the present disclosure, any one or more of these transactions may be recorded in a distributed ledger/blockchain of nodes 171-175. In one example, oracle 161, oracle 162, or the like may be configured to detect such events (in some examples these oracles may participate or facilitate such transaction(s)) and to report such events to the smart contract (e.g., to one or more of the nodes 171-175). Alternatively, or in addition, in one example, oracle 162 may record transactions locally. For instance, resource(s) 152 may include a database server, or servers, to record user/participant locations throughout an incident, user/participant biometrics, etc. In one example, the data is thus maintained locally. However, a recordation of the occurrence of the transaction may be added to the distributed ledger/blockchain (e.g., without including the actual underlying data). It should again be noted that the recordation of data by oracle 162 or others may be governed by smart contract or other programmed rules, programs, instructions, etc. However, the on-chain smart contract may expect these oracles to behave according to well-defined rules that integrate with the main, on-chain smart contract. Thus, while some group event data (e.g., location data, biometric data, transaction records, etc.) may be stored on resource(s) 152, other data may be stored within the distributed ledger (e.g., other transaction records, summary or occurrence information relating to transaction records stored by resource(s) 152, and so forth).

In one example, service provider network 140 may implement policies that govern access to resource(s) 152 with respect to user/device identifiers. For instance, service provider network 140 may maintain a service-to-identifier mapping for the temporary identifier (e.g., the temporary phone number) associated with device 182. For instance, user 192 may have a specific, defined role, such as "fire engineer," "rescue swimmer," "pilot," "engine driver," "crane operator," etc., which may entitle the user 192 to access to certain resource(s) 152, entitle the user 192 to communicate with certain other users, such as user 194, etc. For example, user 192 may be paired with user 194 and dispatched to perform a task. In one example, biometric data of users 192 and 194 may be reported periodically and recorded by service provider network 140 (e.g., in resource(s) 152). During such task, user 192 may lose sight of user 194 and may wish to check on user 194 by requesting biometric data of user 194 from resource(s) 152. In one example, resource(s) 152 may apply local policy to determine whether to provide device 182 with the data requested. Similarly, device 182 may be permitted to obtain contact information of selected other users, or a list of contact information of other users in a particular class/category (e.g., other users with a same role as user 192). Thus, user 192 may obtain a directory or contact information entry for user 194 that includes a telephone number associated with device 184.

It should be noted that since device 184 is a subscriber device of network 101 (e.g., a native device), in one example, device 184 may not be assigned a temporary number in connection with the event/group. However, in another example, non-guest users/participants may also obtain and/or be assigned temporary telephone numbers in a similar manner. For instance, this may provide non-guest users with the same benefit of pseudo-anonymity as guest users. At the same time, both guest and non-guest users may provide temporary telephone numbers to others, such as members of the general public, to provide enhanced ability to communicate in a local zone of an incident, with reduced concern about long term privacy implications of providing "real" telephone numbers to strangers.

The foregoing describes just one illustrative scenario that may include the use of temporary identifiers and/or distributed ledger memorialization of event/group transaction data in connection with public safety entities. Thus, it should be appreciated that various other examples may be similarly demonstrated in connection with the system 100. For example, in accordance with the same or a different smart contract, a second PSE associated with service provider network 130 may initiate an event/group relating to another incident with the second PSE. Guest users/participants may be similarly added to the group and may participate in data sharing and communications with the group for the event, e.g., in accordance with temporary identifiers in a similar manner as described above. Likewise, in another example, the service provider network 140 may be associated with an entertainment venue and/or entertainment event organizer, where for example, user 193 may be associated with the venue/event organizer, users 192 and 194 may be visitors/guests with temporary identifiers assigned to devices 182 and 184 for pseudo-anonymous communication with each other, for access to resource(s) 152, and so forth.

It should also be noted that FIG. 1 illustrates just one example topology or configuration of a blockchain network (e.g., nodes 171-175), and that various other examples may be provided. For instance, the blockchain network may be a private blockchain network with nodes only operated by member entities (e.g., network 110, service provider network 140, and/or others). In another example, the blockchain network may be a public blockchain network that is shared by other groups of entities, individuals, etc. Similarly, although oracles 161, 162, 163, and 165 appear to be assigned to specific nodes and resources, in various examples, oracles 161, 162, 163, and 165 may be in communication with various nodes 171-175 of the blockchain network. For instance, all of the nodes may execute the same smart contract and may respond to trigger conditions/inputs from a single oracle. For instance, when oracle 162 detects the initiation of an event/group, all of the nodes may subscribe to an event notification from the oracle 162. Alternatively, or in addition, the oracles 161, 162, 163, and 165 may be configured to notify each other of events, such that respective nodes 171, 172, 173, and 175 associated with the oracles 161, 162, 163, and 165 may all receive the same notifications and may evaluate against the same rules of the smart contact to determine the same associated actions of such rules. To further illustrate, oracle 165 may comprise an oracle that is configured to provide weather data to the blockchain network. In this regard, oracle 165 may access resources(s) 155, which may comprise an extensible markup language (XML) weather data feed, or the like. For instance, in one example, the triggering of the smart contract to establish a temporary group for disaster response may be predicated upon the occurrence of a flood event, a tornado event, a hurricane event, etc. which may be confirmed by way of trusted data from oracle 165. In one example, server(s) 104 may alternatively or additionally perform functions of another oracle in connection with the distributed ledgers/blockchain network as described above.

In addition, it should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. Thus, these and other modifications are all contemplated within the scope of the present disclosure.

Figure 2:
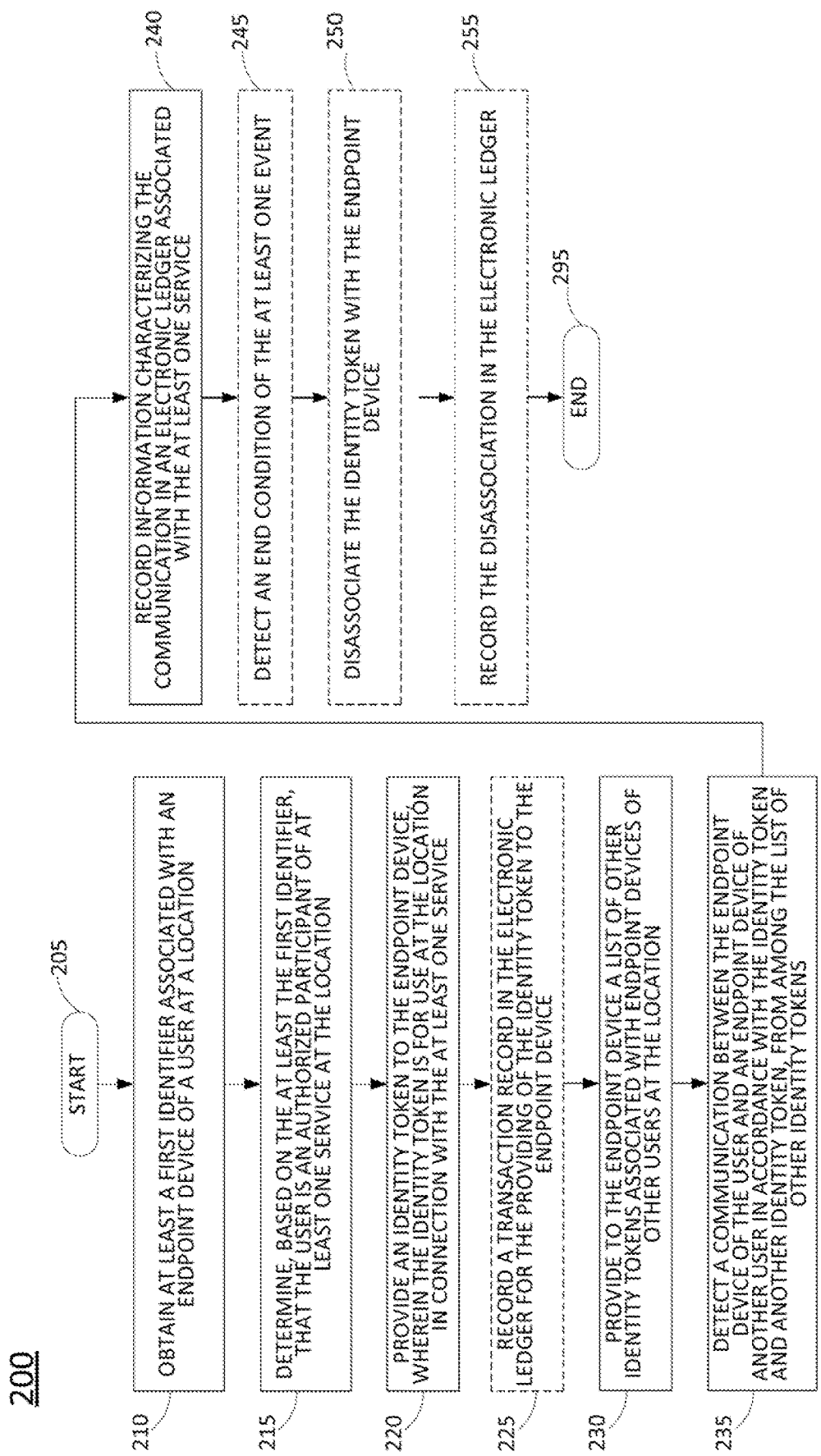
FIG. 2 illustrates a flowchart of an example method for providing an identity token to an endpoint device for use at a location in connection with at least one service.

FIG. 2 illustrates a flowchart of an example method 200 for providing an identity token to an endpoint device for use at a location in connection with at least one service. In one example, the method 200 is performed by a network-based component of the system 100 of FIG. 1, such as by oracle 161, node 171, node 174, or server(s) 104, and/or any one or more components thereof (e.g., a processor, or processors, performing operations stored in and loaded from a memory), by any of such components with another one or more of such components and/or one or more other components of the system 100, such as oracle 162, node 173, resource(s) 152, and so forth. In one example, the steps, functions, or operations of method 200 may be performed by a computing device or system 300, and/or processor 302 as described in connection with FIG. 3 below. For instance, the computing device or system 300 may represent any one or more components of a device, server, and/or application server in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system obtains at least a first identifier associated with an endpoint device of a user at a location. In one example, the obtaining of the at least the first identifier indicates a presence of the endpoint device of the user at the location. For instance, the at least one identifier may comprise at least one of: an international mobile equipment identifier, a mobile equipment identifier, or a first international mobile subscriber identity. In one example, the at least one identifier may further comprise at least one token that is obtained by the endpoint device from at least one external source. For instance, the at least one external source may comprise an authorized endpoint device associated with at least one service at the location. The at least one service may comprise, for example, an entertainment event service, an event venue service, a public service entity service, or a communication network service. In one example, the at least one token may be obtained by scanning a visual code from the at least one external source (e.g., a scannable code, such as a barcode, quick response (QR) code, or the like) to check-in at an event. Alternatively, or in addition, the at least one token may be obtained via an email or text provided by a local PSE being assisted, etc., an near-field communication (NFC) between dedicated applications on the authorized device and the endpoint device of the user, and so on. In one example, the at least one token may include a uniform resource locator (URL) or the like that directs the endpoint device to connect to the processing system over one or more networks.

At step 215, the processing system determines, based on the at least the first identifier, that the user is an authorized participant of the at least one service at the location. For instance, in one example, step 215 may include determining, based on the at least the first identifier, that the user is an authorized participant of at least one service at the location for at least one event. To illustrate, the at least one service (e.g., an event host, a PSE requesting assistance from out of area, etc.) may provide a list of identifiers of authorized guests/visitors (e.g., their existing phone numbers, etc.). Alternatively, or in addition, an authorized device of the at least one service may obtain the identifier of the endpoint device and/or user upon check-in, and may forward such identifier(s) to the processing system for verification. In one example, step 215 may further include determining that the endpoint device is in a location in which the user is authorized to be a participant. For example, access may be denied if the location is not correct (e.g., if the endpoint device a first responder designated to assist another PSE is still in a home area or in an improper location, or the like).

At step 220, the processing system provides an identity token (e.g., a temporary identifier) to the endpoint device, wherein the identity token is for use at the location in connection with the at least one service. In one example, the identity token may comprise a telephone number (e.g., a second international mobile subscriber identity, or the like). For instance, the telephone number may be temporarily associated with the SIM of the endpoint device (e.g., an eSIM that supports dual/multi-SIM). In this regard, it should be noted that the processing system may be deployed in the communication network and may be enabled to assign temporary identifiers, disassociate temporary identifiers from SIMs and/or IMEIs, reassign temporary identifiers, and so forth. In one example, the user may be a first responder that is assisting outside of a home area (e.g., a guest participant). The user may not be a subscriber of a network operator that serves a local PSE being visited. However, the endpoint device can be temporarily added to the network and integrated with the local PSE via the temporary identity token. In one example, users of local PSE can continue to use existing identities, or can similarly be given temporary identity tokens for group membership relating to an incident.

At optional step 225, the processing system may record a transaction in an electronic ledger (e.g., associated with the at least one service (e.g., for an event, or group, associated with the at least one service)) for the providing of the identity token to the endpoint device. For instance, the electronic ledger may comprise a distributed ledger, e.g., a blockchain ledger. In one example, the processing system may comprise a blockchain node that maintains a copy of the blockchain ledger. In one example, the processing system may execute a smart contract. For instance, the processing system may be a node in a blockchain network in accordance with Hyperledger, enterprise Ethereum, or the like. Alternatively, or in addition, the processing system may comprise a smart contract oracle. In this regard, it should be noted that any one or more steps of the method 200 may be performed in accordance with a smart contract that may comprise rules that indicate conditions (e.g., externally verifiable conditions) and corresponding actions that may be implemented in a network-based system. Thus, for example, step 220 may comprise an evaluation of one or more inputs (e.g., one or more identifiers, endpoint device location, etc.) against one or more rules, and the providing of the temporary identity token as a corresponding output/action in accordance with such one or more rules, and so on for any one or more of the other steps of the method 200.

At step 230, the processing system provides to the endpoint device a list of other identity tokens associated with endpoint devices of other users at the location. For instance, the user may have an assigned role (e.g., "fire engineer," "engine driver," "truck driver," etc.). In addition, the role may be associated with one or more entitlements to access contact information of other users (e.g., the other identity tokens, which may comprise temporary identifiers such as a temporary IMSI, or the like). Similarly, the role may be associated with one or more entitlements to communicate with the other users in accordance with these other identity tokens. In one example, the entitlement to access this information may be defined by smart contract. Alternatively, or in addition, the entitlement may be defined in a separate policy database (e.g., of the at least one service provider) that may be accessed and used by the processing system in connection with step 230.

At step 235, the processing system may detect a communication between the endpoint device of the user and the endpoint device of another user in accordance with the identity token and another identity token, from among the list of other identity tokens. For instance, for an entertainment service, the identity token may enable access to the location and/or a venue at the location, and may also permit communication with other users at the location (and who are also authorized participants). Likewise, for a PSE/first responder example, the identity token may enable access to the location and/or a venue at the location (e.g., a user may check-in upon arrival at a command center, etc., while a security perimeter may be maintained around a building that the user may need to access), and may also permit communication with endpoint devices of other users at the location (and who are also authorized participants). In addition, the identity token may permit the endpoint device to contribute data to be stored and/or shared in the community, and/or to access data stored for and/or generated by the community (e.g., biometrics, camera feeds, etc.). Thus, for instance, the communication may be to obtain a camera feed from another first responder, to obtain biometric data of other first responders at an incident, to trade or access a seat at an entertainment venue, and so forth.

As noted above, the processing system may be deployed in the communication network, where a temporarily assigned phone number (e.g., IMSI associated with the endpoint device's eSIM) may cause the endpoint device to receive network services from the communication network as a "native" device (e.g., non-roaming). As such, the communications between the endpoint device and the other participants can be facilitated via one or more dedicated slice(s), edge resources, etc., where it is unnecessary to route communications via infrastructure of another network operator, etc. For instance, the processing system may cause network resources to be provisioned (e.g., a dedicated slice, one or more bearers, etc.). In other words, in one example, step 240 may include receiving a communication request between the endpoint device of the user and an endpoint device of another user in accordance with the identity token and another identity token, from among the list of other identity tokens, and establishing a communication between the endpoint device of the user and the endpoint device of the other user.

At step 240, the processing system records information characterizing the communication in the electronic ledger associated with the at least one service (e.g., for an event, or group, associated with the at least one service). For instance, the "information characterizing the communication" may also comprise a "transaction record" in the electronic ledger. In addition, it should be noted that in an example in which the electronic ledger is a blockchain ledger, multiple transactions records may be bundled into a block for writing to the blockchain ledger.

At optional step 245, the processing system may detect an end condition of the at least one event. For instance, in one example, optional step 245 may include obtaining a notification from blockchain node(s) in accordance with a smart contract condition being satisfied. In one example, the processing system may obtain external data from one or more sources that indicate an end condition. For instance, the processing system may comprise a smart contract oracle that is configured to monitor an XML weather data feed that indicates an emergency weather condition has ended, to communicate with a PSE incident management system, where an authorized personnel of the PSE may provide an input that declares the event has "ended," and so forth.

At optional step 250, the processing system may disassociate the identity token with the endpoint device (e.g., in response to detecting the end condition at optional step 245). For instance, the processing system may be configured to receive a notification of the end condition and to disassociate identity tokens (e.g., temporary phone numbers) from assigned endpoint devices/user.

At optional step 255, the processing system may record the disassociation in the electronic ledger. In one example, the processing system may declare the event has ended, make the dissociation, and record in the electronic ledger (e.g., a blockchain ledger). For instance, it is again noted that the processing system may comprise the oracle or external entity in communication with the oracle.

Following step 245 or any of optional steps 245-255, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example, the processing system may repeat steps 210-230 or steps 210-240 for other users/endpoint devices, steps 210-255 for additional events/groups, and so on. In one example, the method 200 may include generating at least one access token and providing the at least one access token to an authorized device (e.g., to be further distributed to visitors/guest users, etc. to obtain access to a temporary identifier (which may subsequently be used for physical access, access to communications with other authorized participants, etc.)). In one example, the method 200 may include receiving a smart contract for implementation by the processing system. In one example, the method 200 may include obtaining a notification of a start of an event/group associated with the at least one service, or receiving data indicative of the start of an event, and determining the start of the event (e.g., as an action according to one or more smart contract rules). In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 3:
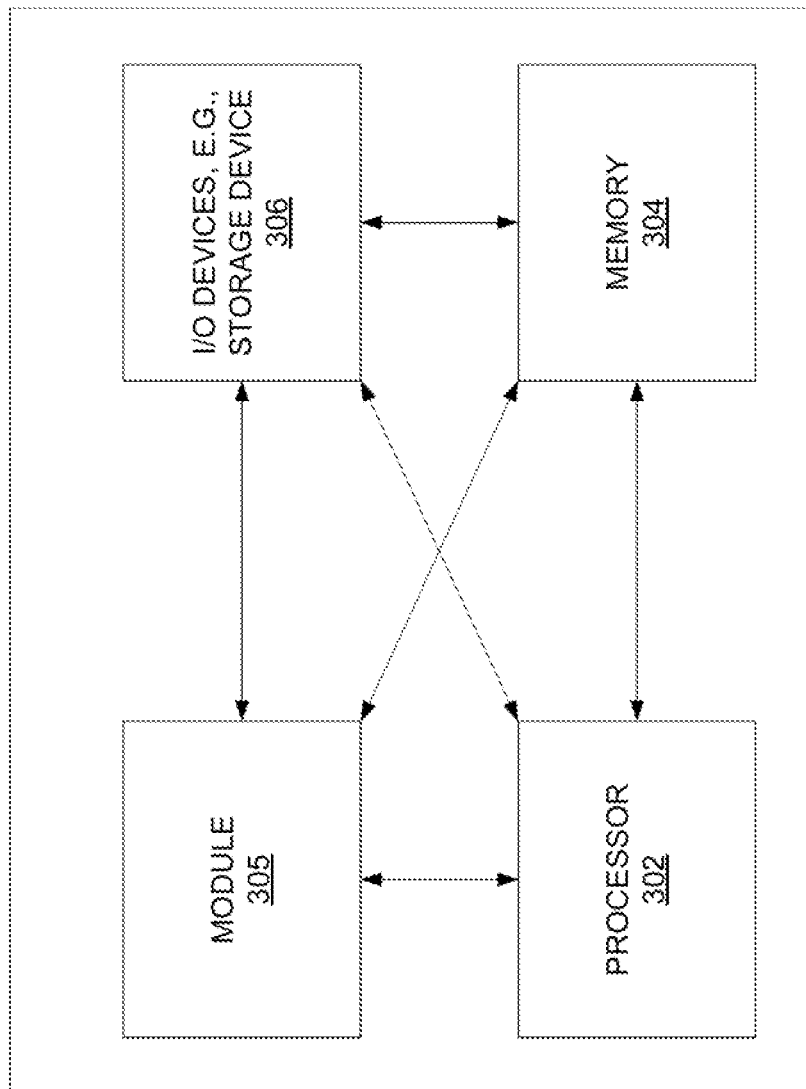
FIG. 3 illustrates a high level block diagram of a computing device specifically programmed to perform the steps, functions, blocks and/or operations described herein.

FIG. 3 depicts a high-level block diagram of a computing device or processing system specifically programmed to perform the functions described herein. For example, any one or more components or devices illustrated in FIG. 1 or described in connection with the example(s) of FIG. 2 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for providing an identity token to an endpoint device for use at a location in connection with at least one service, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for providing an identity token to an endpoint device for use at a location in connection with at least one service (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for providing an identity token to an endpoint device for use at a location in connection with at least one service (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by a processing system including at least one processor, at least a first identifier associated with an endpoint device of a user at a location, wherein the at least the first identifier comprises at least a first international mobile subscriber identity, and wherein the obtaining of the at least the first identifier indicates a presence of the endpoint device of the user at the location;
   determining, by the processing system, based on the at least the first identifier, that the user is an authorized participant of at least one service at the location for at least one event;
   providing, by the processing system, an identity token to the endpoint device, wherein the identity token comprises a second international mobile subscriber identity, and wherein the identity token is for use at the location in connection with the at least one service;
   providing, by the processing system to the endpoint device, a list of other identity tokens associated with endpoint devices of other users at the location;
   detecting, by the processing system, a communication between the endpoint device of the user and an endpoint device of another user of the other users in accordance with the identity token and another identity token, from among the list of other identity tokens;
   recording, by the processing system, information characterizing the communication in an electronic ledger associated with the at least one service;
   detecting an end condition of the at least one event; and
   disassociating the identity token with the endpoint device.

2. The method of claim 1, wherein the at least the first identifier further comprises at least one of:
   an international mobile equipment identifier; or
   a mobile equipment identifier.

3. The method of claim 1, wherein the endpoint device comprises an electronic-subscriber identity module.

4. The method of claim 2, wherein the at least the first identifier further comprises:
   at least one token that is obtained by the endpoint device from at least one external source.

5. The method of claim 4, wherein the at least one external source comprises an authorized endpoint device associated with the at least one service at the location.

6. The method of claim 4, wherein the at least one token is obtained by scanning a visual code from the at least one external source.

7. The method of claim 1, wherein the at least one service comprises:
   a communication network service.

8. The method of claim 1, wherein the at least one service comprises:
   an entertainment event service; or
   an event venue service.

9. The method of claim 1, wherein the at least one service comprises:
   a public service entity service.

10. The method of claim 1, further comprising:
    recording a transaction record in the electronic ledger for the providing of the identity token to the endpoint device.

11. The method of claim 1, wherein the electronic ledger comprises a distributed ledger.

12. The method of claim 11, wherein the distributed ledger comprises a blockchain ledger.

13. The method of claim 12, wherein the processing system comprises a blockchain node that maintains a copy of the blockchain ledger.

14. The method of claim 12, wherein the processing system executes a smart contract.

15. The method of claim 12, wherein the processing system comprises a smart contract oracle.

16. A non-transitory computer-readable medium storing instructions which, when executed by a processing system including at least one processor, cause the processing system to perform operations, the operations comprising:
    obtaining at least a first identifier associated with an endpoint device of a user at a location, wherein the at least the first identifier comprises at least a first international mobile subscriber identity, and wherein the obtaining of the at least the first identifier indicates a presence of the endpoint device of the user at the location;
    determining, based on the at least the first identifier, that the user is an authorized participant of at least one service at the location for at least one event;
    providing an identity token to the endpoint device, wherein the identity token comprises a second international mobile subscriber identity, and wherein the identity token is for use at the location in connection with the at least one service;
    providing to the endpoint device a list of other identity tokens associated with endpoint devices of other users at the location;
    detecting a communication between the endpoint device of the user and an endpoint device of another user of the other users in accordance with the identity token and another identity token, from among the list of other identity tokens;
    recording information characterizing the communication in an electronic ledger associated with the at least one service;
    detecting an end condition of the at least one event; and
    disassociating the identity token with the endpoint device.

17. An apparatus comprising:
    a processing system including at least one processor; and
    a computer-readable medium storing instructions which, when executed by the processing system, cause the processing system to perform operations, the operations comprising:
       obtaining at least a first identifier associated with an endpoint device of a user at a location, wherein the at least the first identifier comprises at least a first international mobile subscriber identity, and wherein the obtaining of the at least the first identifier indicates a presence of the endpoint device of the user at the location;
       determining, based on the at least the first identifier, that the user is an authorized participant of at least one service at the location for at least one event;
       providing an identity token to the endpoint device, wherein the identity token comprises a second international mobile subscriber identity, and wherein the identity token is for use at the location in connection with the at least one service;
       providing to the endpoint device a list of other identity tokens associated with endpoint devices of other users at the location;
       detecting a communication between the endpoint device of the user and an endpoint device of another user of the other users in accordance with the identity token and another identity token, from among the list of other identity tokens;
       recording information characterizing the communication in an electronic ledger associated with the at least one service;
       detecting an end condition of the at least one event; and
       disassociating the identity token with the endpoint device.

18. The apparatus of claim 17, wherein the at least the first identifier further comprises at least one of:
    an international mobile equipment identifier; or
    a mobile equipment identifier.

19. The apparatus of claim 17, wherein the endpoint device comprises an electronic-subscriber identity module.

20. The apparatus of claim 18, wherein the at least the first identifier further comprises:
    at least one token that is obtained by the endpoint device from at least one external source.

* * * * *